United States Patent

Gateau

[11] Patent Number: 4,671,730
[45] Date of Patent: Jun. 9, 1987

[54] VEHICLE OF USE IN PARTICULAR TO A DISABLED PERSON

[76] Inventor: Eugene Gateau, La Marcquinière, Coex, France, 85220

[21] Appl. No.: 652,222

[22] Filed: Sep. 17, 1984

[30] Foreign Application Priority Data

Sep. 15, 1983 [FR] France .................. 83 14714

[51] Int. Cl.$^4$ ................................ B60P 1/30
[52] U.S. Cl. ................... 414/495; 414/541; 414/549; 414/921
[58] Field of Search .............. 414/495, 540–542, 414/545, 546, 549, 556, 921; 296/65 R

[56] References Cited

U.S. PATENT DOCUMENTS

| | | |
|---|---|---|
| 2,581,333 | 1/1952 | Vawter . |
| 2,950,073 | 8/1960 | McLain et al. .............. 414/540 X |
| 3,957,164 | 5/1976 | Brown ..................... 414/921 X |
| 4,083,429 | 4/1978 | Abbott .................... 414/541 X |
| 4,134,504 | 1/1979 | Salas et al. . |
| 4,184,709 | 1/1980 | Kim ....................... 296/146 X |
| 4,297,071 | 10/1981 | Dunbar .................... 414/542 |
| 4,461,609 | 7/1984 | Zinno ..................... 414/495 |

FOREIGN PATENT DOCUMENTS 1087555 10/1980 Canada .
2617754 3/1977 Fed. Rep. of Germany .
2110997 6/1983 United Kingdom .

Primary Examiner—Frank E. Werner
Assistant Examiner—Stuart J. Millman
Attorney, Agent, or Firm—Wenderoth, Lind & Ponack

[57] ABSTRACT

This motor vehicle is of use to a disabled person 43 who moves about on a wheeled chair 44 and comprises a compartment 1 which has an openable panel 8 on one of its sides and includes horizontal slideways 11 which are disposed perpendicular to said opening. A support is slidable in these slideways 11 and, in a withdrawn position of the support, is partly located outside the compartment 1. A panel 22 is vertically movable between branches 13 of the support to which it is connected by a raising device 25, 27. When the branches 13 are in a drawn out position, the panel 22 is lowered down to the ground while remaining horizontal by the raising device 25, 27. A wheeled chair 44 is then easily placed on the panel 42 which is raised, and the support is introduced into the compartment 1 by a driving device provided for this purpose.

11 Claims, 6 Drawing Figures

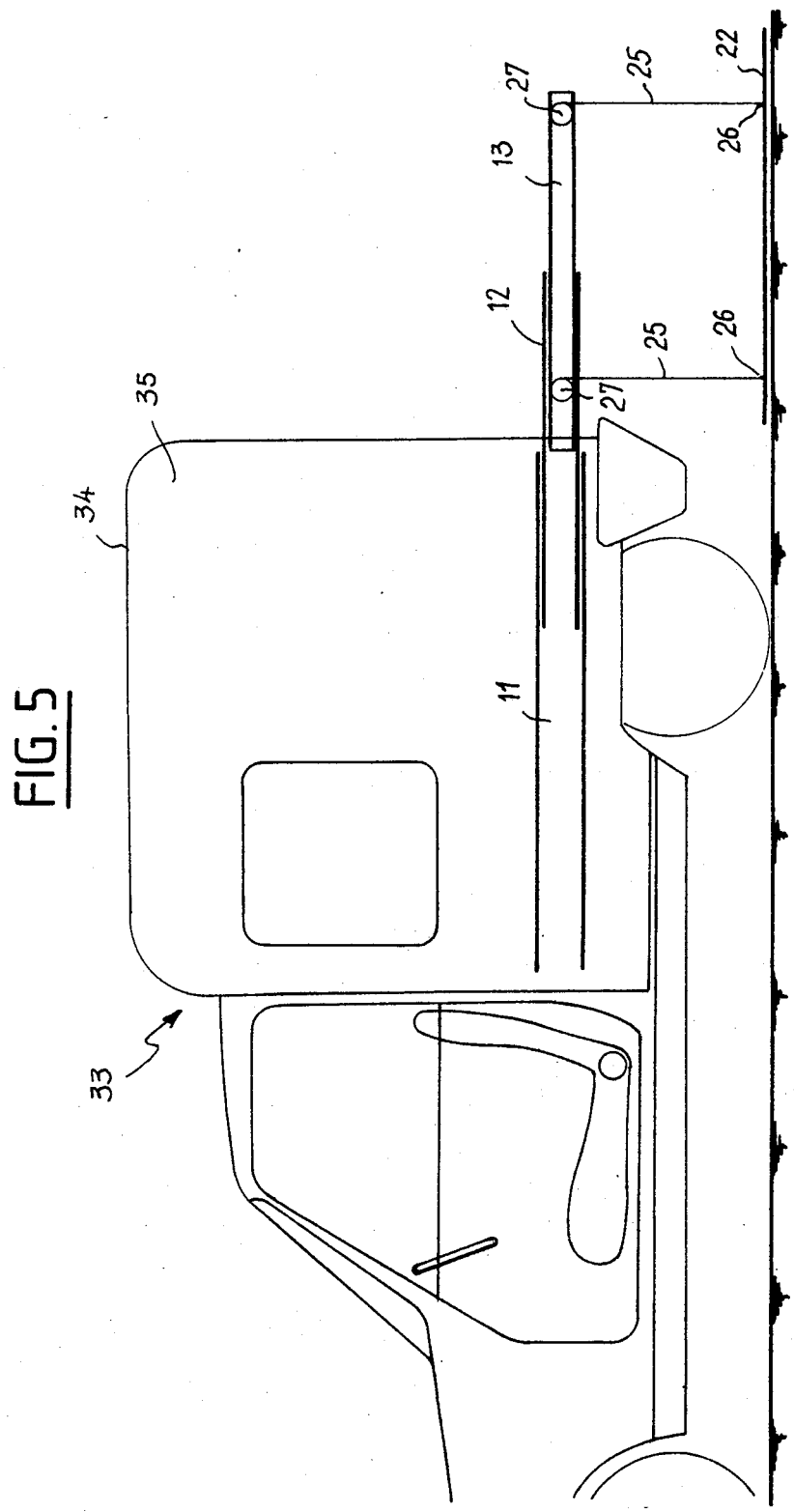

VEHICLE OF USE IN PARTICULAR TO A DISABLED PERSON

BACKGROUND OF THE INVENTION

The invention relates to motor vehicles which are arranged in particular for receiving, as the driver or passenger, a disabled person who moves about on a wheeled chair.

Such vehicles are already known. In particular Canadian patent CA-No. 1087555 discloses a vehicle equipped with a platform for receiving the wheeled chair and which is movable vertically relative to a support, which latter is horizontally movable in translation in slideways carried by the floor of the vehicle. However, in this known arrangement, the nature of the means for raising the platform and the position of the slideways limit its use to a vehicle of the utility type and do not permit the adaptation thereof to a normal motor vehicle.

SUMMARY OF THE INVENTION

In order to overcome this drawback, one of the objects of the present invention is to provide a vehicle with an ordinary chassis and without use of inclined planes, which permits easy access or loading thereof, in particular for a disabled person who moves about on a wheeled chair.

The invention therefore provides a motor vehicle comprising a compartment at the rear side thereof which includes an opening closed by a movable panel, guide means extending roughly horizontally in a direction roughly perpendicular to the rear side of the compartment, a first support movable in said guide means between two end positions, one of which is located at least partly outside the vehicle, and a second support carried by the first support and connected to the latter by raising and lowering means. The compartment comprises lateral walls defining wheel passages which project inwardly of the compartment. Guide means are disposed above the wheel passages roughly against the lateral walls of the compartment and extend for a large part of the length of the compartment.

Accordingly to other features of the invention:

The vehicle is provided with an upwardly opening rear door, or hatch back pivotally mounted on the roof covering the compartment and the rear door is pivotable about a transverse axis approximately located in the middle of the length of the roof.

The vehicle comprises a horizontal floor defining the lower part of the compartment and a part of this floor in the region of the driving station is lowered relative to the rest of the floor.

BRIEF DESCRIPTION OF THE INVENTION

A better understanding of the invention will be had from the following description which is given solely by way of example with reference to the accompanying drawings in which:

FIG. 5 is a diagrammatic view of another type of vehicle according to the invention;

DETAILED DESCRIPTION

Figure 3:
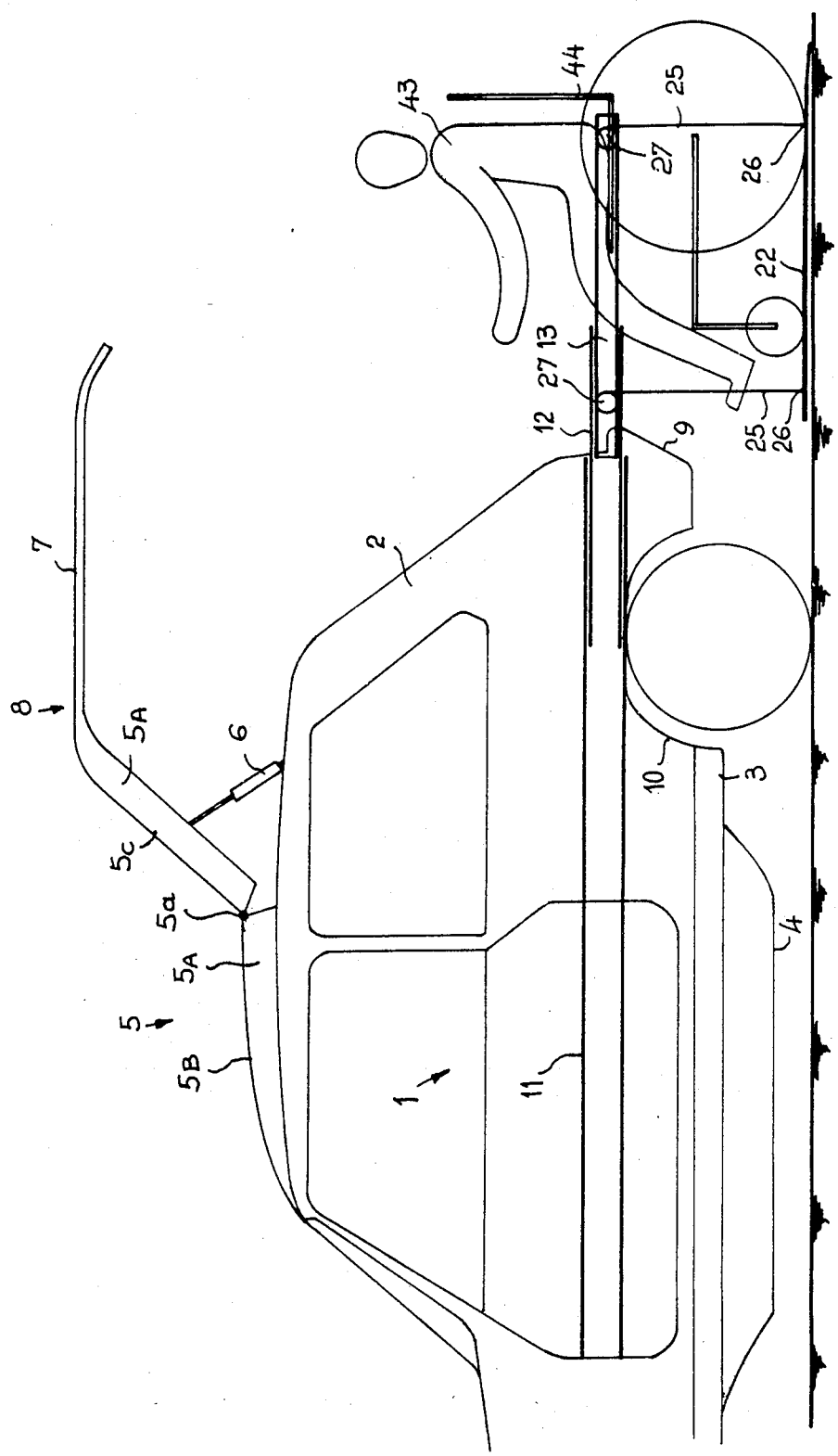
FIGS. 3 and 4 are diagrammatic elevational views of a vehicle according to the invention in two positions of use.
Figure 4:
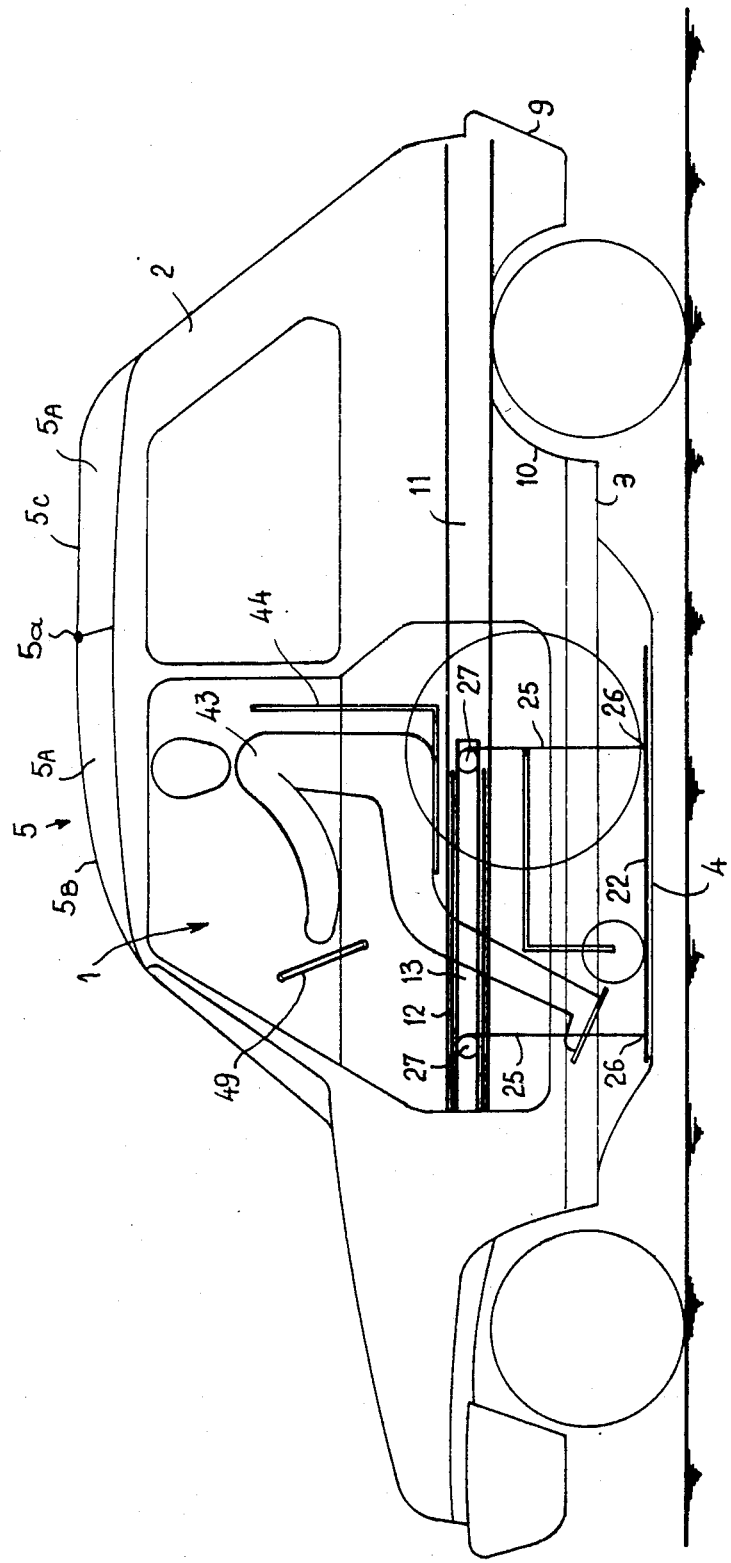

Diagrammatically represented in FIGS. 3 and 4 is a vehicle according to the invention constructed from a conventional mass-produced automobile.

There will merely be described here the main modifications made in the basic vehicle.

A compartment 1 is laterally defined by substantially planar and vertical walls 2 which extend longitudinally of the vehicle, and, in the front part of the vehicle, by a conventional dashboard, control panel and windshield. A horizontal floor 3 generally comprises in the region of the seat of the driver, a part 4 which is lowered below the plane of the wheel axles, while the rest of the floor 3 is at its usual level.

A substantially planar roof 5 provided with lateral edge portions 5A extending the lateral walls 2, covers the compartment 1. It rises at a slight slope in the rearward direction and includes two parts. A front part 5B is fixed, and hinges 5a connect it to a pivotable rear part 5C.

The pivot axis extends transversely of the vehicle and is located roughly in the middle of the roof. This rear part 5C is connected to the lateral walls 2 by telescopic jacks 6 and is extended rearwardly by a panel 7 which is in one piece therewith and with which it forms an upwardly opening rear door or hatch back 8.

In the lower or closed position, this panel 7 extends from one lateral wall to the other and extends downwardly down to the level of the rear bumper 9.

Each lateral wall includes a wheel passage or arch 10 which projects inwardly of the compartment.

Guide rails or slideways 11, which are located approximately against the walls 2 and above, below or adjacent the wheel passage 10, are fixed to the body of the vehicle by welding or any other suitable means. These slideways 11 are rectilinear, have a C-shaped cross-section and are disposed in a substantially horizontal plane in parallel relation to each other and extend throughout the length of the compartment, the openings of the C-shaped section of the slideways being in confronting relation. A rectilinear intermediate slideway 12 having a C-shaped section is fitted in each guide slideway 11 and is shorter than the latter.

The intermediate slideways 12 freely slide in the guide slideways 11 and their openings of the C-shaped section are also in confronting relation. They are longitudinally movable from the front end of the guide slideways 11 to an exterior position in which they partly extend out of the compartment 1 at the rear of the vehicle, as represented in FIGS. 3 and 4. Abutments provided on the sets of slideways determine their end positions.

Slidably mounted in each intermediate slideway 12 is a longitudinal element 13 having a rectangular cross-sectional shape.

Figure 2:
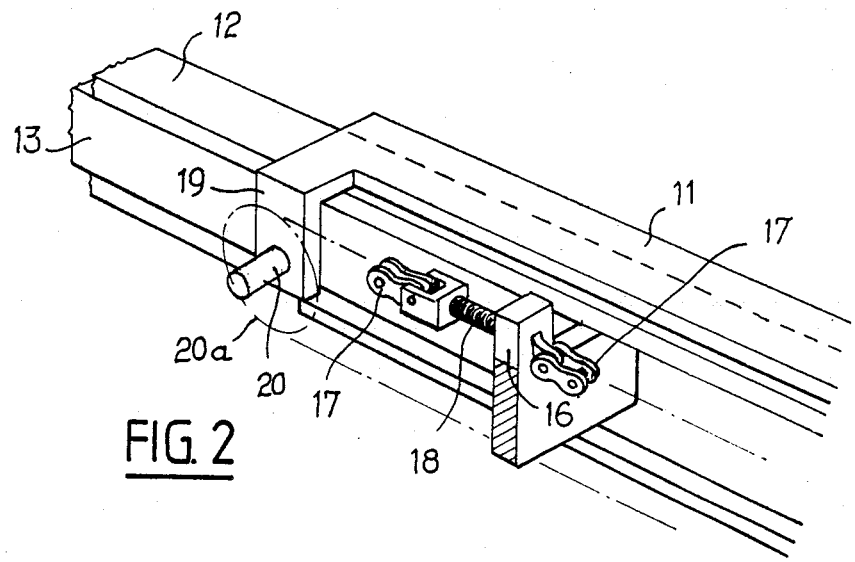
FIG. 2 is a perspective view of a detail of the device shown in FIG. 1.

The longitudinal elements 13, which have roughly the same length as the intermediate slideways 12, are interconnected by a cross-member 14 with which they constitute a support 15 in the form of a U-shaped frame which is open at the rear of the vehicle and is longitudinally slidable in the slideways 12 and capable of moving from the front end of the compartment 1 to a rear end position in which the intermediate slideways 12 partly extend out of the guide slideways 11 and the longitudinal elements 13 partly extend out of the intermediate slideways so that they are almost entirely located outside the compartment 1. At their exterior end. the longitudinal elements 13 comprise shoulders 13a adapted to abut against the end of the intermediate slideways 12. An upwardly projecting tab 16 on the left end of the cross-member 14 acts as a fastening point for two ends of a driving chain 17 which is provided with a chain tensioning tightening mechanism 18 (FIG. 2). Fixed to the rear end of the left guide slideway 11 is a tab 19 in the form of a bracket connected to the upper flange of the slideway 11 so as to partly close the C-shaped section.

Fixed to this tab 19 is a spindle 20 on which a sprocket wheel 20a is freely rotatable. The chain 17 extends around this sprocket wheel and around another sprocket wheel fixed on the output shaft of an electric motor speed reducer unit 21 disposed at the front end of this left slideway 11, to which it is suitably secured. The path of the chain 17 is shown in dot-dash lines in FIGS. 1 and 2.

Figure 1:
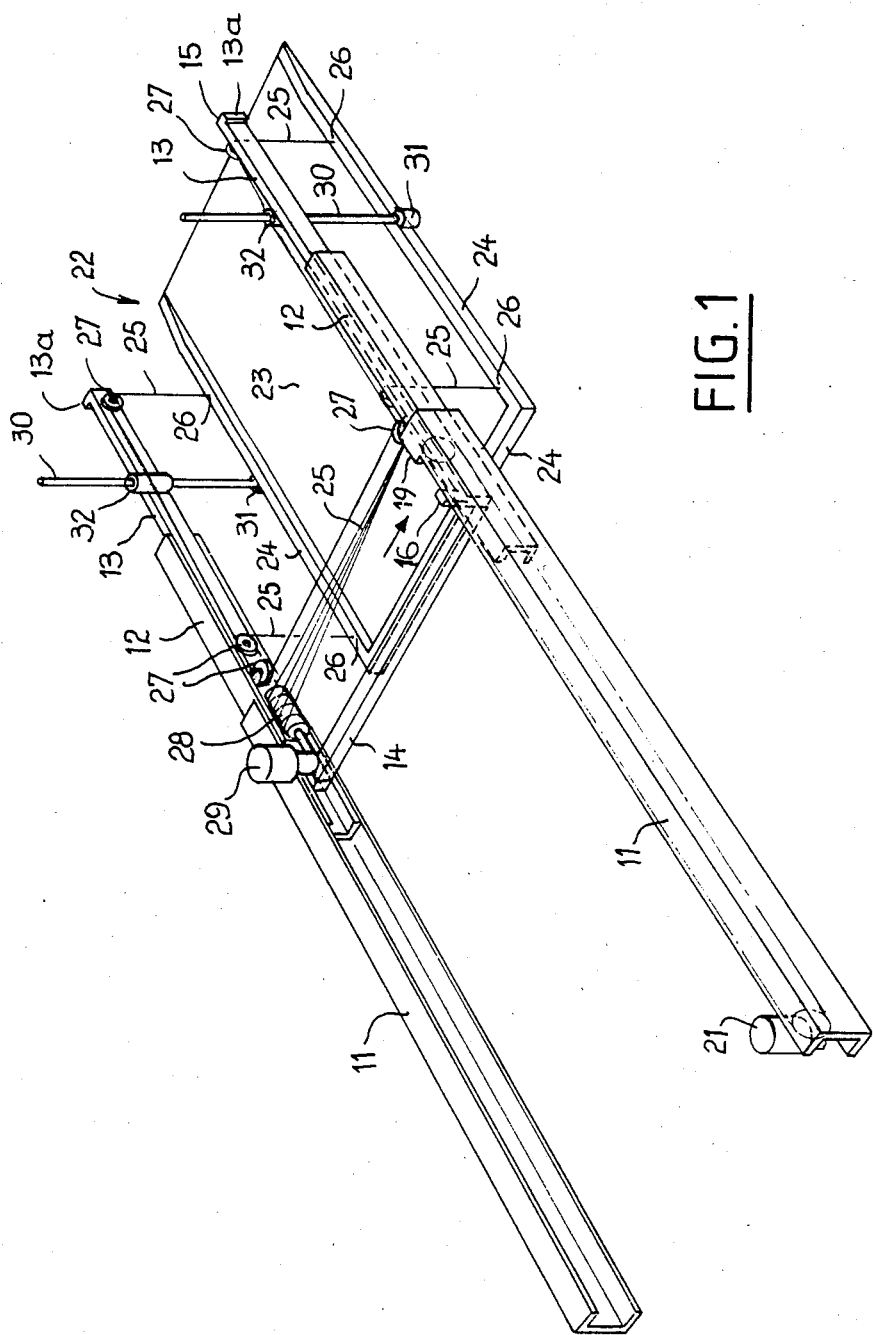
FIG. 1 is a diagrammatic perspective view of a device equipping a vehicle according to the invention.

A second support 22 in the shape of a rectangular panel is carried by the support 15. The second support 22 is movable from a position within the compartment to a position completely outside the compartment. This panel 22 is disposed horizontally and is composed of a metal plate 23 which is reinforced on three of its sides by section members 24. Two cables 25 are attached at two points 26 which are longitudinally spaced apart on each lateral section member 24. After extending around a set of pulley 27 which are freely rotatively mounted on the support 15 and arranged as shown in FIG. 1, the four cables 25 are simultaneously wound around a drum 28 which is fixed on the output shaft of a motor-speed reducer unit 29. This unit 29 is secured to the right side of the cross-member 14.

A cylindrical guide rod 30 is fixed in a vertical position by its lower end by means of a flange 31 to a point which is roughly located in the middle of the outer edge of each lateral section member 24. Each rod 30 is slidably mounted in a cylindrical sleeve 32 which is fixed in a corresponding manner to the interior of the longitudinal elements 13. The flanges 31 and/or the sleeves 32 may be pivotally mounted by ball joints on their respective supports.

FIG. 5 shows a vehicle according to the invention which is constructed from a small van 33 of conventional type comprising a loading space defined by a raised roof 34, vertical lateral walls 35, a flat floor and a rear door providing access to the interior of the van. Guideways 11 extend roughly throughout the rear section of the loading space.

Figure 6:
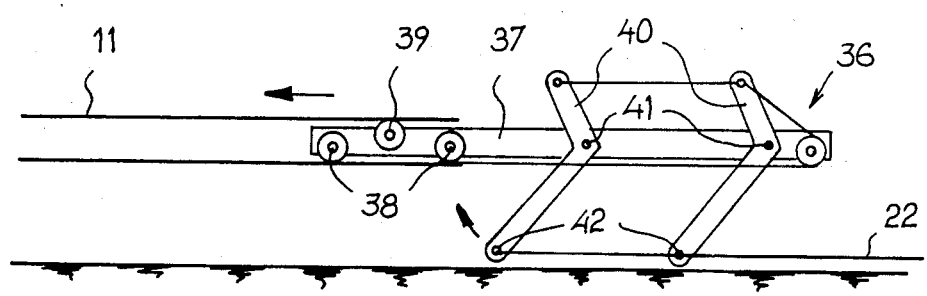
FIG. 6 is a partial diagrammatic side elevational view of a modification of the device shown in FIG. 1.

FIG. 6 diagrammatically represents a support 36 which is slidable in guide slideways 11 and differs from the previously described support.

This support has an H shape and is placed horizontally, the lateral branches 37 of the H-shaped support sliding in the guide slideways 11. The part of each branch 37 located adjacent to the front of the vehicle is provided with three rolling rollers disposed in a triangular arrangement. The two rollers 38 of the base of the triangle are freely rotatably mounted on the H-shaped support and roll along the lower flange of the C-shaped section of a slideway 11, while the apex roller 39 of the triangle is freely rotatively mounted between the other two rollers and rolls along the upper flange of the last-mentioned slideway 11.

Further, the second support is connected to the first support by four cranked levers 40 which are disposed parallel to each other at the four corners of a rectangle, each being rotatable in a vertical plane about a horizontal pin 41 which connects the corner of each lever to the longitudinal elements 37. The lower end of each lever 40 is pivotally mounted on the framework of the panel 22 by a second pin 42. The upper branch of each lever 40 is connected to the motor-speed reducer unit 29 through a suitable arrangement of cables and pulleys. The pins 41 and 42 of the two levers 40 located on the same side of the supports 36 and 22 are located at the corners of a deformable parallelogram structure.

The arrangement shown in FIGS. 1, 2, 3 and 4 operates in the following manner. It will be assumed that the controls for opening the rear door 8 (latch and jacks) and the controls of the motor-speed reducer units 21 and 29 are provided with devices for a remote control, for example by means of an infra-red ray unit of the type employed for television sets. A disabled person 43 who moves about on a wheeled chair 44 and who has the use of his hands, remotely controls in succession the opening of the door 8. The extension of the support 15 to the end exterior position thereof and the lowering of the panel 22 until it rests on the ground. This person then brings his wheeled chair 44 onto the panel 22, which does not require any particular effort, and actuates means for locking the chair to the panel (these means have not been shown in the drawing).

The user then brings about the raising of the panel 22 by the motor-speed reducer unit 29 and, when the panel reaches the level of the guide slideways 11, he brings about the introduction of the support 15 in the vehicle by the motor-speed reducer unit 21. It will be understood that end-of-travel contacts may be provided for stopping the panel in the correct position.

The rear door or hatch 8 is so arranged that, in the open position, the top of the head of the user passes without difficulty thereunder until the rear end of the panel 22 has passed beyond the wheel passages or arches 10. He then brings about a first lowering stage down to the level of the floor 3 and continues the sliding in the forward direction. When he becomes within reach of the steering wheel 49, he brings about the last stage of the lowering of the panel 22 into the lowered floor part 4 and the closure of the door 8. It will be observed that after the locking of the wheeled chair all the subsequent stages of the introduction can be programmed in a simple manner or rendered automatic by means of judiciously placed micro-contacts. In order to leave the vehicle, it is sufficient to effect the procedure in the opposite direction.

The major advantage of the invention is to provide a disabled person with an autonomous use of a relatively cheap vehicle, since it is constructed from a conventionable model by means of secondary modifications of the body, the installation of a rather simple device and the at present conventional adaptation of the controls of the vehicle.

Further, a large choice of models may be provided and it is pleasant for a disabled person to be in a position to use in an autonomous manner a relatively common vehicle.

The modification shown in FIG. 5 is even more cheaply constructed than the foregoing arrangement and permits the transportation of a disabled person as a passenger.

For reasons of economics or improvement, the motor-speed reducer units, the cables, the chains and the pulleys may be replaced by other devices such as hydraulic jacks or electromechanical mechanisms such as screw-and-nut devices.

What is claimed is:

1. A motor vehicle comprising:

a compartment including a floor, a rear side and lateral walls, each of said lateral walls having wheel arches which extend inwardly of said compartment;

a roof covering said compartment;

an opening defined in said rear side for access to the interior of said compartment;

movable panel means for closing said opening, said panel means including a rear door pivotally mounted about an axis which extends transversely of said vehicle and which is located approximately in the middle of the length of said roof;

guide means extending substantially horizontally in a direction substantially perpendicular to said rear side of said compartment, said guide means being disposed above said floor and adjacent said wheel arches, said guide means being located approximately against said lateral walls and extending substantially throughout the length of said compartment;

first support means movable in said guide means between a first end position in which said first support means is at least partly located outside said compartment and a second end position in which said first support means is located inside said compartment;

second support means carried by said first support means and movable therewith from a first position above said floor and entirely within said compartment to a second position completely outside said compartment;

moving means for moving said first support means in said guide means between said first and second end positions thereof and thereby for moving said second support means between said first and second positions thereof; and raising and lowering means, connecting said second support means to said first support means, for raising and lowering said second support means with respect to said first support means when said second support means is in at least said second position thereof;

whereby a user in a wheeled chair may be moved on said second support means from a position outside said compartment to a position inside said compartment without removing the wheeled chair from said second support means.

2. The vehicle of claim 1, wherein separate means are used for moving said first support means relative to said guide means and for raising and lowering said second support means relative to said first support means.

3. The vehicle of claim 2, wherein said moving means for moving said first support means relative to said guide means includes an electric motor-speed reducer unit connected by means of sprocket wheels to a driving chain, said electric motor-speed reducer unit being mounted on said guide means and said driving chain being fixedly attached to said first support means.

4. The vehicle of claim 2, wherein said means for moving said first support means relative to said guide means includes an electric motor-speed reducer unit mounted on said guide means and an electro-mechanical mechanism connecting said electric motor-speed reducer unit to said first support means.

5. The vehicle of claim 1, wherein said raising and lowering means includes an electric motor-speed reducer unit mounted on said first support means, said electric motor-speed reducer unit having an output shaft, a drum fixedly attached to said output shaft, a plurality of pulleys rotatively mounted on said first support means, a plurality of cables attached at one end to said second support means, each of said plurality of cables supported by one of said pulleys, said plurality of cables attached at the other end thereof to said drum, whereby said second support means is suspended by said cables and is raised and lowered by rotation of said drum.

6. The vehicle of claim 1, further including a plurality of rods which are fixedly attached at one end thereof to said second support means, a plurality of sleeves fixedly attached to said first support means, each of said plurality of rods being mounted for slidable movement in one of said plurality of sleeves.

7. The vehicle of claim 1, wherein said guide means includes two slideways, said slidesays having a C-shaped cross-section.

8. The vehicle of claim 1, further comprising intermediate slideways slidably mounted in said guide means, said first support means being slidably mounted in said intermediate slideways, and said intermediate slideways being movable to extend partly out of said compartment.

9. The vehicle of claim 1, wherein said raising and lowering means comprises two sets of cranked levers which are pivotally mounted on said first support means and pivotally mounted on said second support means, said two sets of cranked levers defining two articulated parallelogram structures, and actuating means connected to said two sets of cranked levers for causing raising and lowering of said second support means relative to said first support means.

10. A motor vehicle comprising:

a compartment including a floor, a rear side and lateral walls, each of said lateral walls having a wheel arch therein;

an opening defined in said rear side for access to the interior of said compartment;

movable panel means for closing said opening;

guide means extending substantially horizontally in a direction substantially perpendicular to said rear side of said compartment, said guide means being disposed above said floor, said guide means being located approximately against said lateral walls adjacent each said wheel arch and extending substantially throughout the length of said compartment;

first support means movable in said guide means between a first end position in which said first support means is at least partly located outside said compartment and a second position in which said first support means is located entirely inside said compartment;

second support means movable by said first support means from a first position entirely within said compartment to a second position above said floor and entirely outside said compartment;

moving means for moving said first support means in said guide means between said first and second end positions thereof and thereby for moving said second support means between said first and second positions thereof; and raising and lowering means, connecting said second support means to said first support means, for raising and lowering said second support means with respect to said first support means when said second support means is in at least said second position thereof;

whereby a user in a wheeled chair may be moved on said second support means from a position outside said compartment to a position inside said compartment without removing the wheeled chair from said second support means.

11. A motor vehicle comprising:

a compartment including a floor, a rear side and lateral walls, each of said lateral walls having wheel arches which extend inwardly of said compartment, said floor including a section which is at a lower level than the remainder of said floor, said section at a lower level being in a region of said compartment corresponding to a vehicle driving station;

an opening defined in said rear side for access to the interior of said compartment;

movable panel means for closing said opening;

guide means extending substantially horizontally in a direction substantially perpendicular to said rear side of said compartment, said guide means being disposed above said floor and said wheel arches, said guide means being located approximately against said lateral walls and extending substantially throughout the length of said compartment;

first support means movable in said guide means between a first end position in which said first support means is at least partly located outside said compartment and a second end position in which said first support means is located inside said compartment;

second support means carried by said first support means and movable therewith from a first position above said floor and entirely within said compartment to a second position completely outside said compartment;

moving means for moving said first support means in said guide means between said first and second end positions thereof and thereby for moving said second support means between said first and second positions thereof; and raising and lowering means, connecting said second support means to said first support means, for raising and lowering said second support means with respect to said first support means when said second support means is in at least said second position thereof, said raising and lowering means being operable for raising and lowering said second support means with respect to said first support means when said second support means is over said section of said floor at a lower level than the remainder of said floor;

whereby a user in a wheeled chair may be moved on said second support means from a position outside said compartment to a position inside said compartment without removing the wheeled chair from said second support means.

* * * * *